United States Patent Office 3,018,244
Patented Jan. 23, 1962

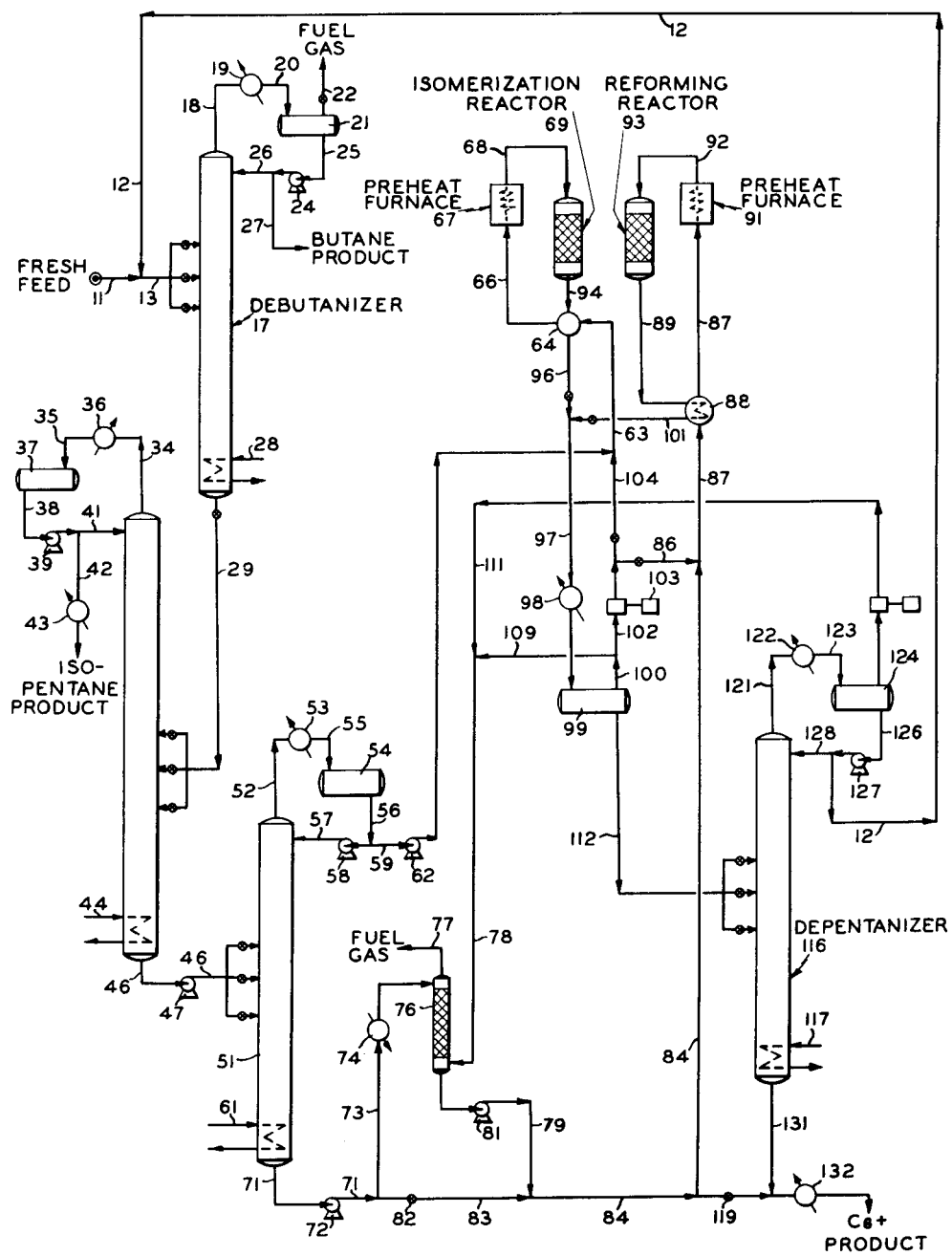

3,018,244
COMBINED ISOMERIZATION AND
REFORMING PROCESS
George W. Stanford, Linden, and William R. Partridge,
Livingston, N.J., assignors to The M. W. Kellogg Company, Jersey City, N.J., a corporation of Delaware
Filed Dec. 18, 1958, Ser. No. 781,393
8 Claims. (Cl. 208—79)

This invention relates to an improved hydrocarbon conversion process. In one aspect this invention relates to an optimum sequence of steps for effecting the reforming and isomerization of hydrocarbons. In another aspect it relates to a process for the conversion of hydrocarbons to higher octane components in the presence of hydrogen in optimum conversion and wherein the product materials are recovered in an economical manner with a minimum loss thereof. In still another aspect this invention relates to a hydrocarbon conversion process wherein the process streams are interrelated in a manner such that maximum efficiency of operation and recovery of product are attained.

The process of catalytic reforming in the presence of hydrogen has had wide acceptance as a means of converting low octane hydrocarbon fractions boiling in the gasoline naphtha range to hydrocarbon mixtures having a higher octane rating. The reactions which provide transformation are widely recognized in the art to include hydrocracking, aromatization, cracking, isomerization, cyclization, dehydrogenation, hydrogenation and others. Depending on the type of catalyst used and its method of preparation one or more of these reactions may be emphasized in relation to the other reactions. Of those listed isomerization, dehydrogenation and hydrocracking are among the principal reactions.

The usual reforming feed comprises a mixture of varied and complex hydrocarbons including paraffins, isoparaffins, olefins, diolefins both saturated and unsaturated and unsaturated cyclic compounds, and compounds containing various inorganic constituents and having a wide range of molecular weight and varying structural configurations. When these compounds are contacted with a catalyst in a reforming reaction zone, the reactions which take place strongly indicate a varied susceptibility of the type compounds to catalytic reaction, temperature and pressure. In a sense the reforming reactions appear to compete with each other. Therefore, it is difficult when treating the usual complex feed mixture to control the degree of any individual reaction or reactions to provide a specific product distribution. The impossibility of establishing operating conditions which provide an optimum converson of each compound in the reforming feed makes it necessary to carry out the conventional reforming process under conditions which provide instead the best average or over-all conversion of the feed components to give a product of relatively high octane number. Although reforming of naphtha fractions has had wide acceptance, in recent years the development of high compression automotive engines has caused the octane requirements of the automotive industry to spiral upwards to an octane number level approaching 100 and higher and consequently standard 92 octane leaded gasoline obtained from conventional hydrocarbon conversion processes is losing in commercial value since it cannot meet the present-day standards demanded by industry.

In view of the difficulties involved in the production of premium gasolines and the high cost thereof it has become a critical problem of refiners to produce such gasoline with maximum efficiency and with a minimum of complicated and involved apparatus and equipment. It has long been recognized that in the design of hydroforming units it is important that there be a minimum of loss of valuable gasoline components and further that the process streams be interrelated in such a manner that there is little or no need for extraneous means in the recovery of product material. Among the disadvantages of prior art processes for upgrading hydrocarbon fractions of petroleum crude oil are inefficiency of operation and loss of valuable gasoline components, the requirement of numerous separation steps and reaction zones, the production of products having a relatively low octane number due to the fact that a significant amount of material enters the final gasoline blend without being subjected to upgrading, and a lack of interrelation of process streams in a manner such that the process can be operated as cheaply as possible. The present invention is concerned with a method by which such disadvantages are overcome.

It is an object of this invention to provide an improved hydrocarbon conversion process.

Another object of this invention is to provide a combination catalytic process for upgrading hydrocarbon oil fractions in the presence of hydrogen which process involves the use of a minimum number of reaction zones and separation steps and wherein the hydrogen requirements of the process are furnished by the overall process without the necessity of an extraneous source thereof.

Another object is to provide a combination process for the catalytic isomerization and catalytic reforming of hydrocarbons wherein valuable normally liquid gasoline components are recovered in an economical and efficient manner from normally gaseous components produced during the process.

A further object of this invention is to provide a hydrocarbon conversion process wherein the process streams are interrelated in such a manner that there is little or no need for extraneous means in the recovery of desired product materials.

Various other objects and advantages of this invention will become apparent to those skilled in the art from the accompanying description and disclosure.

Accordingly, the above objects are accomplished by subjecting a mixture of hydrocarbons comprising $C_5$ and heavier hydrocarbons to a particular sequence of steps comprising in combination isomerization of n-pentane together with $C_6$ hydrocarbons in the presence of hydrogen, reforming a fraction comprising $C_7+$ hydrocarbons, combining the effluents of the isomerization and reforming processes and separating the combined effluent into a hydrogen-rich gas and a fraction containing normally gaseous hydrocarbon side-products having normally liquid hydrocarbons dissolved therein, utilizing a portion of the hydrogen-rich gas as the source of hydrogen required for the isomerization and reforming reactions and passing another portion of the hydrogen-rich gas together with the normally gaseous hydrocarbon fraction to an absorber tower wherein valuable gasoline components are removed therefrom by utilizing a portion of the reformer feed comprising $C_7+$ hydrocarbons as the absorbent.

In accordance with the process of this invention a fresh feed comprising a mixture of $C_5$ hydrocarbons including isopentane and n-pentane, $C_6$ hydrocarbons including cyclic and acyclic compounds, and $C_7$ and higher molecular weight hydrocarbons is combined with a fraction essentially comprising n-pentane and isopentane which is separated and recycled from a later stage of the process. The resultant feed stock mixture is then separated into a fraction essentially comprising isopentane, a fraction comprising n-pentane and $C_6$ hydrocarbons including n-hexane and branched hexanes (isohexanes), and a fraction comprising cyclic $C_6$ hydrocarbons and the $C_7+$ hydrocarbons, the fraction essentially comprising isopentane being recovered as a product of the process. A portion of the fraction comprising the cyclic $C_6$ hydrocarbons and $C_7+$ components is passed directly to a reforming zone wherein it is contacted with a reforming catalyst under suitable reforming conditions to produce reformer effluent product of higher octane number and hydrogen. The fraction comprising n-pentane and $C_6$ hydrocarbons is passed to a single isomerization reactor wherein the mixture is contacted with a solid isomerization catalyst in the presence of hydrogen under suitable isomerization conditions such that n-pentane is converted to isopentane and the hexanes are converted to more highly branched isomers. The effluents withdrawn from the isomerization and reformer reactants are then combined and the combined effluent is separated into a hydrogen rich normally gaseous stream, a normally gaseous hydrocarbon stream, a fraction essentially comprising n-pentane and isopentane, and a normally liquid fraction containing the isomerized hexanes and the reformed liquid product. The fraction essentially comprising isopentane and n-pentane is then combined with the fresh feed entering the system and, as indicated above, the isopentane is recovered therefrom as a product of the process, and the n-pentane is recycled together with the n-pentane and hexanes of the fresh feed to the isomerization zone for further upgrading.

A portion of the hydrogen-rich gas separated from the combined reactor effluent is introduced into the individual streams entering the isomerization and reformer reaction zones while another portion of the hydrogen-rich gas together with the stream of normally gaseous hydrocarbon side-products separated from the combined reactor effluents, is passed to an absorber tower wherein valuable gasoline components comprising $C_5$ hydrocarbons are removed therefrom by passing it in countercurrent flow with a portion of the feed passing to the reforming unit. The gasoline enriched reformer feed is separated from the absorber tower and is combined with the stream of hydrocarbons passing directly to the reformer.

The catalysts used to effect the isomerization reaction comprises a group VIII metal such as rhodium, platinum, palladium, iridium, ruthenium, osmium and nickel or compounds thereof on an adsorptive carrier material. The content of the group VIII metal may vary over a relatively wide range such as from about 0.01 to about 10 weight percent and is preferably between about 0.02 and about 6 weight percent. Catalysts having acidic characteristics generally lead to the best results and comprise a group VIII metal fixed on a carrier material containing certain acidic or acid acting components, i.e. a component which confers acidic characteristics to the catalyst base material. The use of the acid acting component, the particular one selected, and the concentration in which it is employed depends to a large extent upon the degree of activity and selectivity which may be desired in any one reaction, as well as on the type of side reactions which can be tolerated.

The adsorptive carrier material for the group VIII metal such as platinum, palladium and rhodium is preferably a high surface area inorganic support such as alumina, silica, magnesia, zirconia, titania, thoria, vanadia, gallia and mixtures thereof such as alumina-silica, silica-zirconia, silica-alumina-zirconia, alumina-gallia, silica-magnesia, silica-zirconia, silica-alumina-zirconia and silica-vanadia. The various forms of adsorptive alumina, silica, etc. that are capable of absorbing gases on their surface and which have been found to be useful in catalyst compositions for hydrocarbon conversion reactions may be used as the supporting material. Of these, alumina is preferred such as aluminas derived from synthetic alumina hydrates known as bayerite, gibbsite or boehmite. The alumina base is preferably one having gamma and/or eta modifications, and it is desirable that the alumina base have a large pore and large area structure. This base is formed by dehydration of hydrated alumina in which alumina trihydrates predominate. One suitable method for converting the alumina to the desired precursor alumina system involves aging the gel which is maintained at a pH of about 8 to 10 for a period of several days. Another method involves seeding the gel in the preparation process with crystallites of gibbsite, for example. The transition to the desired phase system in which the crystalline trihydrate forms of alumina predominate may be roughly controlled with experience by visual observation.

Synthetic alumina gels may be prepared by precipitating a solution of aluminum salt such as aluminum chloride or sulfate or ammonium hydroxide to form a gelatinous precipitate. The resultant precipitate is then worked free of chloride or sulfate ion. Alternatively, highly active alumina gels may be prepared by hydrolysis of an aluminum alkoxide. The resultant precipitate may be peptized by addition of a weak acid such as acetic acid to convert the precipitate to a gel.

As indicated above, the catalysts to be used in accordance with the process of this invention preferably contain as a third type of ingredient, an acid acting component including boron oxide, gallia, chromia, hydrogen fluoride, boron fluoride, and metal complexes thereof. These particular components which confer acidic properties to the catalyst base material such as alumina, may be used individually, or in combination with one another, without departing from the scope of this invention. Thus, for example, the catalyst comprising a group VIII metal such as rhodium, fixed on one of the aforesaid carrier materials such as alumina, may contain either boron oxide, hydrogen fluoride, etc., as essentially the sole acid acting component, or a combination thereof may be incorporated into the catalyst composition. The acid acting component may be incorporated into the catalyst in various forms. Thus, for example, when boron oxide is used as the promoter, it is usually added to the catalyst preparation in the form of a boric acid solution. When fluoride is used as the acid acting component, it is usually incorporated in the form of a water soluble compound such as ammonium fluoride or hydrofluoric acid. When a fluorided boron oxide is used as the acid acting promoter, it is usually incorporated as a solution of ammonium fluoborate. In each instance the extraneous component or components will be lost readily by volatilization during subsequent treatment of the catalyst composite at elevated temperatures.

Typical examples of the above-described isomerization catalysts comprising a group VIII metal on an inorganic carrier material are as follows: boria-platinum-alumina, for example, platinum-alumina containing from about 15 to about 25 percent boria; rhodium-alumina-boria, for example, rhodium-alumina containing from about 2 to about 25 percent by weight boria, and preferably from 10 to 20 weight percent; fluorided rhodium-alumina, for example, rhodium-alumina containing from about 2 to about 22 percent fluorine; ruthenium-alumina-boria; iridium-alumina-boria; and fluorided ruthenium-alumina.

Catalysts having especially good activity and selectivity for effecting the isomerization of the feeds comprising $C_5$ and $C_6$ hydrocarbons of this invention are those comprising a group VIII metal such as rhodium or platinum on an inorganic support such as alumina and containing a relatively high content of combined fluorine such as a constant substantially not lower than about 10 weight percent and as high as about 18 or about 22 weight percent of combined fluorine. When such highly fluorided catalysts are employed to effect isomerization of pentane and hexane the conversions per pass approach equilibrium conversions and the degree of cracking is negligible, i.e., there is only very low or essentially no formation of compounds having less than 5 carbon atoms per molecule.

Within the reforming zone there may be used any of the conventional types of reforming catalysts. One such group of reforming catalysts comprises platinum or palladium composited with a cracking component. The percent of the metal in the catalyst usually is between about 0.01 and about 10 percent by weight and more preferably between about 0.05 and about 1.5 percent. The cracking component comprises any suitable cracking catalyst including either natural or synthetic materials including acid treated clays and synthetic catalysts such as silica, alumina, silica-alumina, silica-zirconia, etc. Another group of catalysts also useful in promoting the reforming reaction are the aforesaid reforming catalysts containing combined halogen, for example fluorine or chlorine in an amount between about 0.1 and about 8 percent by weight.

Another group of catalysts also useful in promoting the reforming reaction comprises the oxides or sulfides of elements of group VIB, for example, chromium, molybdenum, or tungsten supported preferably on alumina but also on magnesia, natural clays, crushed silica, etc. In general, the chromium, molybdenum or tungsten comprises between about 1 and about 20 weight percent. Yet another group of catalysts comprises heterpoly acids having at least one central acid group selected from the oxides or sulfides of elements of groups VA and VIA and outer acid groups in the ratio of about 3-12 to 1 selected from the oxides of elements of groups VB and VIB, for example, molybdenum acid iodate, phosphomolybdic acid, silico tungstic acid, etc.

Catalysts used for reforming become contaminated with carbonaceous materials after prolonged use and require regeneration to renew their activity. Unfortunately, the regeneration process does not provide a catalyst having an activity equal to the original uncontaminated catalyst and the catalyst becomes permanently partially deactivated. Such catalysts although no longer fully effective for reforming are nevertheless effective in promoting isomerization reactions. Therefore, it is within the scope of this invention to isomerize with the aforesaid isomerization catalysts or with catalysts previously used in reforming or with mixtures thereof.

The catalysts suitable for use in the process of this invention may be prepared by a variety of methods. For example in preparing the above catalysts comprising a group VIII metal, one suitable method involves adding the group VIII metal in the form of a water soluble compound such as the chloride or sulfate to an alumina gel. The metal-containing gel may then be dried at a temperature between about 200° and about 275° F. followed by calcining and/or treatment with hydrogen. Alternatively the group VIII metal bearing compound may be added to the dried gel and the mass then calcined or treated with hydrogen at an elevated temperature. Another method comprises sulfiding the solution of the group VIII metal salt by reaction with ammonium sulfide or hydrogen sulfide before addition to the alumina. The acid acting components such as fluorine, boria, etc., may be incorporated into the metal-containing gel either before or after calcination of the dried gel or at any other stage in the catalyst preparation. Calcination of the dried catalyst composite may be accomplished by calcining at a temperature between about 500° F. and about 1200° F. for a period of about 2 to about 6 hours, for example, for 2 hours at 1000° F. in the presense of air, oxygen or nitrogen. Alternatively, active catalysts are prepared by treating the dried catalyst mass in the presence of hydrogen at a temperature usually between about 400° F. and about 1000° F. for a period of time between about 1 and about 4 hours. It is to be understood that the dried catalyst may be calcined and then treated with hydrogen, or the calcination step may be omitted and the dried catalyst treated directly with hydrogen under the aforesaid conditions.

Boria-alumina-rhodium isomerization catalysts, for example, may be prepared by a variety of methods. For example, the alumina-rhodium mass may be calcined and then soaked in a solution of boric acid followed by drying and calcined under the aforesaid conditions. Boria may be added instead to the dried but uncalcined alumina-rhodium and the composite mass may then be dried and calcined.

Fluorided alumina-rhodium catalysts, for example, may be prepared by soaking the dried gel in a solution containing hydrofluoric acid, drying at about 200° to 275° F. and then calcining at about 800° to 1200° F. Alternatively, the rhodium-alumina mass may first be calcinated and dry treated with hydrofluoric acid.

Fluorided boria-alumina-rhodium catalysts, for example, may be prepared by soaking the dried alumina-rhodium preparation in separate solution of hydrofluoric acid and boric acid followed by drying and calcinating. Alternatively, the alumina-rhodium preparation may be soaked in a solution of ammonium fluoborate and then dried and calcined.

Catalysts comprising palladium, platinum, iridium, ruthenium and osmium, etc., are prepared in a manner similar to the methods described above for the preparation of rhodium-containing catalysts.

The fresh feed which is used in the process of this invention comprises naphthenes and paraffins which are generally present in straight-run gasoline, natural gasoline, thermally and catalytically cracked gasolines and petroleum naphthas. The gasoline may be a full boiling range material having an initial ASTM boiling range between about 50° F. and about 100° F. and an end point between about 325° F. and about 450° F. or it may be a narrow fraction selected from within this boiling range. If it is preferred to use a naphtha as the fresh feed material, the initial boiling point is generally between about 125° F. and about 250° F. with an end point between about 350 and about 425° F. Narrow naphtha fractions lying within this boiling range are also effectively employed. In general naphtha fractions recovered from any of the petroleum crudes such as Kuwait, West Texas, East Texas, Mid-continent, Gulf Coast, Arabian and Venezuelan crudes are suitable for use in accordance with this invention.

The more common constituents present in the feed stock employed in this invention are $C_5$–$C_{10}$ paraffins and naphthenes. The $C_5$ paraffins or petroleum components of the fresh feed comprise n-pentane and isopentane. The mol ratio of n-pentane to isopentane generally ranges between about 1:2 and about 10:1 and usually ranges between about 1:1 and about 2:1. The $C_6$ paraffins or hexane components of the feed are n-hexane and isohexanes, the mol ratio of the n-hexane to isohexanes generally ranging between about 1:2 and about 2:1 and more usually between about 1:1.5 and about 1.5:1. The isohexane constituents are predominantly 2-methyl pentane and 3-methyl pentane with lesser amounts of 2,3-dimethyl butane and 2,2-dimethyl butane. Present in lesser amounts are the $C_5$ and $C_6$ naphthenes comprising cyclopentane, methyl cyclopentane and cyclohexane and, of these, the latter two are present in the greater amount. On a combined basis, the $C_5$ and $C_6$ hydrocarbons of the feeds employed in this invention, constitute between about 35 and about 75 weight percent of the total feed, the mole ratio of $C_5$:$C_6$ compounds ranging between about 4:1 and about 1:4, more usually between about 2:1 and about 1:2.

The $C_7$–$C_{10}$ components of the feed stock comprise paraffins and naphthenes as the predominant types of compounds with lesser amounts of the corresponding aromatics. The fresh feed also may contain, and usually does contain, lower molecular weight components such as butane including n-butane. In accordance with a preferred embodiment of this invention the fresh feed is debutanized as a first separation step as described in more detail hereinafter.

As mentioned hereinbefore certain reactions predominate in the catalytic reforming of hydrocarbon reactions containing the above-described constituents. For example, hydrocracking occurs extensively with the formation of lower boiling hydrocarbons and a consumption of hydrogen. Aromatization also is an important reaction and it proceeds along two general paths which include dehydrogenation of naphthenes, and cyclization of paraffins followed by dehydrogenation, both of these reactions producing hydrogen. Another reaction which takes place during reforming is the isomerization of paraffins both straight-chain and cyclic. In addition to these, other reactions occur in varying degrees depending on the catalyst being used and the reaction conditions. Since all of the reactions which take place during reforming compete with one another in their effort to transform the compounds present in the hydrocarbon feed, it is necessary to find a method of controlling as far as possible the type of products formed. It is possible to obtain a certain degree of selectivity by varying catalyst composition and the methods of catalyst preparation. Unfortunately, however, the type of product obtained by reforming is always controlled to a certain extent by the composition of the feed irrespective of the catalyst used. This is particularly true with respect to the isomerization of straight-chain paraffins such as n-pentane and n-hexane.

The isomerization of n-pentane to isopentane and the isomerization of hexanes to more highly branched components are both rate and equilibrium reactions, that is the degree of conversion to isopentane and isohexanes is controlled not only by the temperature and pressure and other conditions maintained in the reaction zone but also by the composition of the reactants. For example, when isomerizing n-pentane at a temperature of about 850° F., a pressure of about 800 p.s.i.g. and a weight space velocity of about 4 pounds of hydrocarbon per hour per pound of catalyst in the presence of a platinum-containing catalyst, the equilibrium ratio of isopentane to n-pentane in the reaction product is about 2 moles per mole. Thus, every 100 moles of reaction product contains a maximum of 66.6 moles of isopentane. Further when isomerizing n-hexane to isohexane at a temperature of about 850° F., a pressure of about 800 p.s.i.g. and a weight space velocity of about 4 pounds of hydrocarbon per hour per pound of catalyst in the presence of a platinum-containing catalyst, the equilibrium ratio of isohexane to n-hexane in the reaction product is about 3.2 moles per mole. Thus, every 100 moles of reaction product contains a maximum of 76 moles of isohexane. These equilibrium ratios prevail immaterial of the composition of the feed material prior to the isomerization reaction. If the reactants are present in an amount equivalent to the equilibrium ratio under the aforesaid conditions, no further conversion to more highly branched compounds occurs. If, on the other hand, the reactant ratios are less than the equilibrium ratio, isopentane and isohexane are formed up to the maximum set-forth by the equilibrium ratio. If the ratio of isomerized compounds to the normal compounds in the reactants is greater than the respective equilibrium ratios, the amount of iso-compounds in the reaction product decreases under the aforementioned reaction conditions until the equilibrium ratio is reached.

Inasmuch as the usual catalytic reformer feed contains both n-pentane and isopentane and both n-hexane and isohexanes, it is obvious that the degree of isomerization in any reforming process is effected adversely by equilibrium conditions. In addition, the conditions of temperature, pressure, space velocity, etc. under which reforming takes place are not necessarily those conditions which produce an optimum yield of isomers. Furthermore, the presence of high boiling compounds such as $C_7+$ components in a feed to be treated under isomerization conditions, is undesirable since they tend to decrease catalyst life thereby reducing the conversion of the n-pentane and hexane to the desired $C_5$ and $C_6$ isomers. These represent inherent deficiencies in the present methods of reforming which are overcome by the process of this invention in that (1) $C_5$ and $C_6$ paraffins are separated from the reforming feed stock and are subjected to isomerization in a separate zone under conditions which lead to optimum conversions of the $C_5$ and $C_6$ paraffins to more highly branched compounds; and (2) the isomerization reactor effluent is treated in such a manner so as to remove the major proportion of isomerized product prior to further upgrading of the unreacted components. In this manner conversions of n-pentane to isopentane and of hexanes to more highly branched components in yields approaching the optimum conversions per pass may be realized which is almost impossible to achieve by conventional reforming processes.

In accordance with one embodiment of this invention fresh feed boiling within the aforesaid boiling range is introduced into a first distillation tower together with a fraction essentially comprising n-pentane and isopentane obtained and separated from a later stage of the process. The separation which is effected in the first distillation zone can be practiced under any suitable operating conditions such that an overhead fraction comprising $C_4$ and lighter hydrocarbons present in either the fresh feed or recycled $C_5$ feed is separated therefrom. The pressure maintained in the first distillation zone or debutanizer may vary between about 50 and about 300 pounds per square inch gage and more usually a pressure between about 100 and about 200 p.s.i.g. is preferred. The temperature at which the first distillation zone is maintained may vary between about 120 and about 360° F. and more usually at a temperature between about 120° F. and about 320° F. is preferred. Generally the top of the first distillation zone is maintained at a temperature between about 120 and about 240° F. within the aforesaid preferred pressure range. The overhead fraction essentially comprising $C_4$ and lower boiling constituents is recovered from the first distillation zone and n-butane is recovered therefrom as a product of the process and may be passed to a dehydrogenation or isomerization unit for further processing. The bottoms fraction comprises n-pentane, isopentane, $C_6$ and heavier hydrocarbons and is usually separated from the first distillation zone at a temperature between about 200° F. and about 360° F. within the aforesaid preferred pressure range.

The bottoms fraction obtained from the first distillation zone is passed into a second distillation zone maintained under suitable operating conditions such that an overhead fraction comprising isopentane in an amount preferably in the order of 90 mole percent or higher is separated therefrom. The pressure maintained in the second distillation zone or deisopentanizer may vary between about 10 and about 100 p.s.i.g. and more usually a pressure between about 30 and about 50 p.s.i.g. is preferred. The temperature maintained within the deisopentanizer may vary between about 160° F. and about 260° F. and more usually between about 160° F. and about 240° F. is employed. Generally the top of the second distillation zone is maintained at a temperature between about 160° F. and about 180° F. within the aforesaid preferred pressure range. The overhead fraction essentially comprising isopentane is recovered therefrom as a product of the process and can be added to motor fuel to increase the octane level number thereof. The bottoms fraction comprises n-pentane, hexane constituents and $C_7+$ hydrocarbons and is usually separated from the deisopentanizer between about 220° F. and about 240° F. within the aforesaid preferred pressure range.

The bottoms fraction separated from the deisopentanizer is passed to a third distillation or dehexanizer which is maintained under conditions such that the feed thereto is separated into a normally liquid overhead fraction containing n-pentane, n-hexane and isohexane constituents and a $C_7+$ bottoms fraction which also contains the major proportion of the methylcyclopentane, and cyclohexane present in the fresh feed material. To effect this separation, the dehexanizer is maintained at a pressure between about 15 and about 100 p.s.i.g. and preferably between about 40 and about 60 p.s.i.g. while the temperature of the tower is maintained between about 150° F. and about 370° F. and preferably between about 150°

F. and about 345° F. The upper portion of the dehexanizer is maintained at a temperature between about 150° F. and about 250° F. within the aforesaid pressure range. The overhead fraction comprising n-pentane and $C_6$ hydrocarbons is withdrawn therefrom and combined with hydrogen-rich recycle gas and passed to the isomerization reactor wherein it is contacted with one of the aforesaid solid isomerization catalysts under suitable conversion conditions to convert n-pentane to isopentane and $C_6$ hydrocarbons to more highly branched components.

The bottoms fraction comprising the $C_7+$ hydrocarbons is usually separated from the dehexanizer between about 325° F. and about 345° F. within the aforesaid pressure range. A portion of the bottoms fraction is passed to an absorber tower wherein it is brought into contact with a combined hydrogen-containing normally gaseous stream and a normally gaseous hydrocarbon stream obtained and separated from later stages of the process to remove valuable gasoline components therefrom. The gasoline enriched fraction is then passed together with the remainder of the dehexanizer bottoms fraction and a hydrogen-rich gas to the reforming zone wherein it is contacted with a reforming catalyst such that dehydrogenation, cyclization and hydrocracking reactions occur to produce hydrogen and normally liquid reformed product. Such reactions are also accompanied by the formation of normally gaseous hydrocarbons including $C_1$–$C_4$ components.

The operating conditions maintained within the isomerization reactor may be varied rather widely. Thus, temperatures between about 300° F. and about 900° F. may be suitably employed and usually a temperature range falling between about 500° F. and 800° F. is employed. Within these temperature limits weight space velocities of about 0.1 to about 20 pounds of reactant per hour per pound of catalyst may be employed. However, space velocities within the range of about 0.5 to about 6 generally give the best results. Hydrogen should be introduced into the reaction zone at a rate of from about 200 to about 10,000 standard cubic feet per barrel (s.c.f.b.) and preferably at a rate between about 2,000 and 6,000 s.c.f.b., or the hydrogen to hydrocarbon mole ratio may fall within the range from about 0.1 to about 10 and preferably from about 2 to about 8 moles of hydrogen per mole of hydrocarbon. The total reaction pressure may be maintained at any value between 0 p.s.i.g. and about 1000 p.s.i.g. and is preferably between about 200 and about 800 p.s.i.g. It is desirable that the hydrogen partial pressure be carefully controlled to effect the desired conversion while maintaining the activity of the catalyst and minimizing the coke deposition thereon.

The hydroforming reaction is conducted under more severe operating conditions including a temperature of about 750° F. to about 1057° F., more usually, about 850° F. to about 975° F. The reaction is carried out at a total pressure of about 25 to about 1000 p.s.i.g., more usually, about 50 to about 750 p.s.i.g. Generally, the weight space velocity is about 0.05 to about 20, more usually, about 0.5 to about 12. The hydroforming reaction is conducted in the presence of added hydrogen. The conditions of reaction are selected to produce a net production of hydrogen, consequently, the normally gaseous product material contains an appreciable amount of hydrogen which is recycled for further utilization in the process. The hydrogen containing gas or recycle gas contains about 50 to about 98 percent by volume of hydrogen. The hydrogen rate to the reforming process is about 500 to about 15,000 standard cubic feet, measured at 60° F. and 760 mm. Hg per barrel of oil feed (s.c.f.b.). More usually, the hydrogen rate is about 3000 to about 10,000 s.c.f.b.

The catalytic reactions which take place in the isomerization and reforming reactors may take place in a conventional fluid bed, moving bed, or stationary granular particle bed. When catalists comprising group VIII catalysts are used, fixed or stationary type beds are preferred in order to minimize attrition losses of these highly expensive catalysts. On the other hand, when chromium, molybdenum or tungsten catalysts or heteropoly acids are used, a fluid bed is preferred. In a fixed bed operation the catalyst is deposited in one or more beds arranged serially and/or in parallel, the catalysts being in the form of lumps, granules, etc. or in the form of pellets or other molded shapes. If the fluid type of bed is utilized, it is provided in a conventional manner by passing a gasiform medium through a finely divided catalyst at a sufficient velocity to maintain a highly turbulent dense phase bed.

After the pentane-hexane mixed feed is contacted with one of the aforesaid isomerization catalysts under the aforesaid operating conditions, the isomerization reaction zone effluent comprising hydrogen, unreacted n-pentane, isopentane, hexane having a higher degree of branching than the hexane in the feed material, and lower boiling compounds, is combined with the reforming zone effluent without prior separation of components from the individual effluent streams. The combined effluents are then passed to a high pressure separation zone wherein conditions are maintained to separate a normally gaseous hydrogen-rich stream therefrom. The normally gaseous hydrogen-rich stream also contains $C_1$–$C_4$ hydrocarbons and valuable normally liquid gasoline components including considerable $C_5$ and $C_6$ paraffins, and portions thereof are recycled to the isomerization and reforming reaction zones while another portion is passed to an absorber tower. The high pressure separation zone is maintained at a pressure of about 15 to about 100 pounds per square inch less than the pressure in the reactors, and a temperature between about 50° F. and about 120° F. such that the major proportion of normally liquid compounds are separated therefrom providing for recovery of essentially all of the hydrogen. There is also some carry-over of isopentane, n-pentane and higher boiling hydrocarbons with the hydrogen. The condensed normally liquid fraction separated from the high pressure separation zone containing a major proportion of isomate and reformed product and a minor proportion of lower boiling compounds, is passed to a fourth distillation zone.

The separation effected in the fourth distillation zone can be practised under any suitable operating conditions such that an overhead fraction essentially comprising $C_5$ and lower boiling hydrocarbons is separated. The pressure maintained in the fourth distillation zone or depentanizer may vary between about 120 and about 200 p.s.i.g. and more usually at a pressure between about 140 and about 160 p.s.i.g. and the temperature may vary between about 235° F. and about 400° F. more usually at a temperature not above about 300° F. The overhead fraction may be separated from this zone by maintaining the top of the zone at a temperature between about 235° F. and about 255° F. within the aforesaid preferred pressure range, and the bottoms fraction comprising the isomerized $C_6$ and reformed product is withdrawn from the bottom of the zone at a temperature between about 360° F. and about 380° F. within the aforesaid preferred pressure range, and is recovered as a product of the process.

The overhead fraction withdrawn from the depentanizer is subjected to further separation to remove a normally gaseous hydrocarbon stream containing the $C_1$–$C_4$ side-products, and the remaining normally liquid hydrocarbon fraction essentially comprising isopentane and n-pentane is recycled to the first distillation zone as part of the feed thereto. The normally gaseous hydrocarbon stream which is separated from the depentanizer overhead is introduced into the portion of the hydrogen-rich gas passing to the absorber tower.

As indicated above, within the absorber tower a portion of the reformer feed is used as a lean oil for the absorption of normally liquid hydrocarbons from the hydrogen-rich recycle gas and the normally gaseous hydrocarbon stream separated from the depentanizer overhead. To effect maximum removal of the $C_5$ and higher boiling components from these gaseous streams, the absorber tower is preferably maintained at a pressure of from about 1 to about 50 pounds per square inch less than the pressure in the high pressure separation drum, and at a temperature between about 50 and about 150° F. However, it also is within the scope of this invention, to pass the hydrogen-rich gas separated from the high pressure separation drum, through a compressor in which case the absorber tower is maintained at a pressure up to about 100 pounds per square inch higher than the high pressure separation drum within the aforesaid temperature range. The portion of the reformer feed used as the absorbent is then combined as an enriched oil with the remainder of the reformer feed and the combined stream is passed to the reforming unit, while the remaining stream containing the normally gaseous compounds including $C_1$–$C_4$ compounds are allowed to exit from the absorber as fuel gas.

One of the basic difficulties involved in any process which involves more than one type of reaction is to interrelate the process streams in such a manner that product materials are recovered with a little economic loss as possible and to prepare the feeds including both fresh and recycle feeds, passing to the different reaction zones so that optimum conversions to desired products may be attained. For example, it is extremely important to minimize as far as practical the amount of hydrocarbons which are present in the hydrogen-rich recycle gas introduced into the isomerization zone. Concentrations of hydrocarbons, and especially of the branched $C_5$ and $C_6$ compounds, in the hydrogen-rich gas of more than about 15 mole percent, is disadvantageous in view of the adverse effects thereof on the equilibrium reactions taking place within the isomerization zone. Furthermore, a more dilute hydrogen-rich gas tends to reduce catalyst life and thus lower the conversions to the desired isomers. Such problems in regard to the preparation of fresh feed, recycle feed, and recovery of valuable normally liquid hydrocarbons are solved by the present invention in several ways. For example, the fresh feed material is pretreated as described above, so that an optimum feed is obtained which can be subjected to optimum isomerization conditions which allow for maximum conversion of low branched hydrocarbons to more highly branched materials. In this manner a product of high octane number is produced without a significant amount of material entering the final gasoline blend without having been subjected to upgrading. In the practice of this invention, another advantage is that the reaction zone effluents are such that they may be combined prior to subsequent separation treatment. In this manner the hydrogen-rich gas which is separated from the combined effluents may be distributed to the isomerization and reforming reaction zones and absorber with a minimum loss of valuable gasoline components. Another advantage realized by combining the reformer effluent with the isomerization reaction zone effluent is that the reformer effluent is such that it acts as a solvent for the hydrocarbons contained in the isomerization effluent, and especially for the isomate product including the isopentane and branched hexanes. By so combining the effluents and subsequently separating the hydrogen-rich gas therefrom, the amount of hydrocarbons which is carried over with the hydrogen-rich recycle gas is minimized. For the reasons discussed above, this is an important advantage from the standpoint of maintaining the concentration of the branched compounds entering the isomerization zone at a minimum thereby favoring the equilibrium reactions which take place therein.

The heavier fraction comprising the $C_7$ and higher boiling compounds separated from the fresh feed serves at least two important functions. One such function is that it serves as the source of the hydrogen requirements of the total process by reforming thereof thereby eliminating the necessity of an external source of hydrogen. Another important function of the $C_7+$ hydrocarbon reformer feed is its use as an absorbent to remove the valuable gasoline components from the normally gaseous streams containing light or normally gaseous hydrocarbons which are formed as by-products of the main reactions. In accordance with the teachings of this invention the heavy $C_7+$ hydrocarbon fraction used as the absorbent becomes enriched with the $C_5$ and $C_6$ components which it absorbs selectively from the normally gaseous streams introduced to the absorber. Inasmuch as the $C_5$ and $C_6$ components are derived from the isomerization effluent, the ratio of isopentane to n-pentane and the ratio of n-hexane to isohexane are close to the equilibrium ratios, and thus the $C_5$ and $C_6$ components are allowed to pass with the heavier naphtha fraction to the reformer unit without first separating them therefrom. In this way extraneous means to separate the valuable normally liquid high octane components from the normally gaseous streams and absorbent are unnecessary and, because the ratios of branched compounds to the normal compounds are close to the equilibrium ratios, the desired reforming reactions of selective hydrocracking cyclization and dehydrogenation are not disturbed by a competing isomerization reaction.

EXAMPLE

For a better understanding of the present invention, reference should be had to the accompanying drawing which is a diagrammatical illustration, in elevation, of a suitable arrangement of apparatus for carrying out one embodiment of this invention showing specific working conditions.

Referring to the accompanying drawing a hydrocarbon oil containing $C_4$ and heavier hydrocarbons, and having an ASTM distillation range from about 86° F to about 307° F. and an API gravity of 77.0° is introduced into the system along line 11 where it is joined by recycle feed comprising $C_5$ hydrocarbons flowing through conduit 12 and obtained from a later stage of the process to be described in more detail hereinafter. The combined feed is at a temperature of about 100° F. and is passed along line 13 into the middle section of debutanizer tower 17. The fresh feed is passed through line 11 at a rate of 34,618 pounds per hour and has the composition shown in column 1 of Table I below. The recycle feed is introduced into line 11 at a rate of 11,635 pounds per hour and has the composition shown in column 2 of Table I below. The rate of flow of total feed into debutanizer 17 is 46,253 pounds per hour and its composition is the sum of the constituents in the fresh feed and the recycle feed as tabulated in column 3 of the following Table I.

Table I

| Composition [1] | Fresh Feed | Recycle Feed | Total Feed to Debutanizer 17 |
|---|---|---|---|
| Molecular Weight | | 66.5 | 74.4 |
| Gravity, API° | 77.0 | | |
| $H_2$ | 0 | 2 | 2 |
| $C_1$ | 0 | 11 | 11 |
| $C_2$ | 0 | 85 | 85 |
| $C_3$ | 0 | 302 | 302 |
| Isobutane | 0 | 110 | 110 |
| n-butane | 2,474 | 111 | 2,585 |
| Isopentane | 6,947 | 6,057 | 13,004 |
| n-pentane | 6,018 | 4,449 | 10,467 |
| Cyclopentane | 447 | 37 | 484 |
| 2,2-Dimethylbutane | 248 | 27 | 275 |
| 2,3-Dimethylbutane | 347 | 33 | 380 |
| 2-Methylpentane | 1,583 | 174 | 1,757 |
| 3-Methylpentane | 912 | 116 | 1,028 |
| n-hexane | 2,251 | 121 | 2,372 |
| Methylcyclopentane | 1,987 | | 1,987 |
| Cyclohexane and Benzene | 1,745 | | 1,745 |
| $C_7$ | 4,320 | | 4,320 |
| $C_8$ | 2,900 | | 2,900 |
| $C_9$ | 1,400 | | 1,400 |
| $C_{10}$ | 1,039 | | 1,039 |
| $C_{11}$ | | | |
| Total | 34,618 | 11,635 | 46,253 |

[1] Expressed in pounds per hour.

The top of debutanizer 17 is maintained at a temperature of about 160° F. and a pressure of about 145 p.s.i.g. while the bottom of debutanizer 17 is maintained at a temperature of about 300° F. and a pressure of about 150 p.s.i.g., the heat requirements of the tower being supplied by conventional reboiler 28. In debutanizer tower 17, an overhead fraction having a molecular weight of 53.4 and comprising $C_4$ and lower boiling hydrocarbons is taken overhead through conduit 18 at a rate of 22,827 pounds per hour, and is passed through conventional water condenser 19 to separating drum 21 by means of line 20. In the separating drum which is maintained at a temperature of about 100° F. and a pressure of about 135 p.s.i.g., a portion of the debutanizer overhead fraction is condensed to yield a $C_4$ rich fraction. The condensed liquid (2740 barrels per standard day) is passed from drum 21 through conduit 23 by means of pump 24, and a portion thereof (2370 b.p.s.d.) is returned to debutanizer 17 by means of conduit 26 as reflux. The remainder of the condensed liquid from the drum is withdrawn by means of conduit 27 and is recovered as butane product at a rate of 3065 pounds per hour (370 b.p.s.d.) and has the composition shown in column 1 of Table II below. The debutanizer overhead liquid is rich in normal butane and is recovered as a product of the process, and may be utilized as liquified petroleum gas; as a blending component for gasoline, in which case it is preferred to de-ethanize it; as a starting material for the manufacture of butadiene, or it may be passed to an alkylation or isomerization unit as part of the feed thereto. The uncondensed portion of the debutanizer overhead vapor in drum 21 is withdrawn therefrom by means of conduit 22 at a rate of 115 pounds per hour, and is yielded as fuel gas having the composition set forth in column 2 of Table II below. The debutanizer tower bottoms fraction is rich in $C_5$ and higher boiling hydrocarbons and has the composition shown in column 3 of Table II below, and is withdrawn from tower 17 at a rate of 43,073 pounds per hour (4414 b.p.s.d.) by means of conduit 29 and is then passed to deisopentanizer tower 33.

*Table II*

| Composition [1] | Debutanizer Overhead Liquid (Butane Product) | Debutanizer Overhead Vapor (Fuel Gas) | Debutanizer Bottoms Fraction |
| --- | --- | --- | --- |
| Molecular Weight | 54.4 | 32.9 | |
| Gravity, API° | | | 79.8 |
| $H_2$ | 0 | 2 | 0 |
| $C_1$ | 5 | 6 | 0 |
| $C_2$ | 70 | 15 | 0 |
| $C_3$ | 280 | 22 | 0 |
| Isobutane | 104 | 6 | 0 |
| n-butane | 2,477 | 64 | 44 |
| Isopentane | 129 | 0 | 12,875 |
| n-pentane | | | 10,467 |
| Cyclopentane | | | 484 |
| 2,2-Dimethylbutane | | | 275 |
| 2,3-Dimethylbutane | | | 380 |
| 2-Methylpentane | | | 1,757 |
| 3-Methylpentane | | | 1,028 |
| n-hexane | | | 2,372 |
| Methylcyclopentane | | | 1,987 |
| Cyclohexane and Benzene | | | 1,745 |
| $C_7$ | | | 4,320 |
| $C_8$ | | | 2,900 |
| $C_9$ | | | 1,400 |
| $C_{10}$ | | | 1,039 |
| $C_{11}$ | | | |
| Total | 3,065 | 115 | 43,073 |

[1] Expressed in pounds per hour.

The top of deisopentanizer 33 is maintained at a temperature of about 170° F. and a pressure of about 45 p.s.i.g. while the lower portion is maintained at a temperature of about 232° F. and a pressure of about 55 p.s.i.g. In deisopentanizer 33, a fraction essentially comprising isopentane and having the composition shown in column 1 of Table III below is taken overhead through conduit 34 at a rate of 173,241 pounds per hour, and is passed through a conventional water condenser 36 and thence into accumulator 37 by means of line 35. The accumulator is maintained at a temperature of about 160° F. and a pressure of about 35 p.s.i.g. such that the deisopentanizer overhead is condensed therein. The condensed liquid is withdrawn from accumulator 37 through line 38 by means of pump 39 at a rate of 19,190 b.p.s.d., and a portion thereof (17,800 b.p.s.d.) is returned to deisopentanizer 33 by means of conduit 41 as reflux. The remainder (1390 b.p.s.d.) of the deisopentanizer overhead is passed through line 42 having cooler 43 positioned therein and is recovered as a product of the process at a rate of 12,551 pounds per hour and has an octane number (CFRR+3 cc. TEL) of 104. The heat requirements of deisopentanizer tower 33 are supplied by a conventional reboiler or heat exchange coil 44. The tower bottoms fraction comprising normal pentane as the major $C_5$ component, and higher boiling hydrocarbons and having the composition shown in column 2 of Table III below leaves deisopentanizer tower 33 at a rate of 30,581 pounds per hour by means of conduit 46 and is passed by means of pump 47 to tower 51.

*Table III*

| Composition [1] | Overhead Fraction From Deisopentanizer 33 (Isopentane Product) | Bottoms Fraction From Deisopentanizer 33 |
| --- | --- | --- |
| Molecular Weight | 72.0 | |
| Gravity, API° | | 72.4 |
| $H_2$ | 0 | |
| $C_1$ | 0 | 0 |
| $C_2$ | 0 | 0 |
| $C_3$ | 0 | 0 |
| Isobutane | 0 | 0 |
| n-butane | 44 | 0 |
| Isopentane | 12,093 | 782 |
| n-pentane | 394 | 10,112 |
| Cyclopentane | 0 | 484 |
| 2,2-Dimethylbutane | | 275 |
| 2,3-Dimethylbutane | | 380 |
| 2-Methylpentane | | 1,757 |
| 3-Methylpentane | | 1,028 |
| n-hexane | | 2,372 |
| Methylcyclopentane | | 1,987 |
| Cyclohexane and Benzene | | 1,745 |
| $C_7$ | | 4,320 |
| $C_8$ | | 2,900 |
| $C_9$ | | 1,400 |
| $C_{10}$ | | 1,039 |
| $C_{11}$ | | |
| Total | 12,531 | 30,581 |

[1] Expressed in pounds per hour.

The temperature and pressure conditions maintained within tower 51 are such that the feed thereto is separated into a fraction essentially comprising the $C_5$ components the major one being n-pentane, and acyclic $C_6$ components; and a heavier fraction comprising cyclic $C_6$ components and the $C_7$ and heavier hydrocarbons. For example, when the top of tower 51 is maintained at a temperature of about 208° F. and a pressure of about 45 p.s.i.g. and the lower portion is maintained at a temperature of about 334° F. and a pressure of about 50 p.s.i.g., a vaporous overhead having the composition shown in column 1 of Table IV below is withdrawn therefrom by means of conduit 52 at a rate of 38,761 pounds per hour and passes through condenser 53 into accumulator drum 54 by means of line 55. The pressure and temperature maintained in drum 54 are about 35 p.s.i.g. and 190° F., respectively. The condensed liquid is discharged from drum 54 by means of line 56 with a portion (2050 b.p.s.d.) being returned to tower 51 as reflux by means of line 57 having pump 58 positions therein. The remainder (2040 b.p.s.d.) of the condensed tower overhead fraction passes, by means of pump 62, through conduit 59 at a rate of 19,335 pounds per hour to conduit 63 wherein it is joined by a hydrogen-containing gas having the composition set-forth in column 2 of table IV below, obtained and separated from a later stage of the process to be described in more detail hereinafter.

The combined hydrogen-containing stream passing through conduit 63 is at a temperature of about 125° F. and is passed through heat exchanger 64 wherein it is heated to about 583° F. by picking up heat from the isomerization reactor effluent, and is then passed by means of line 66 to preheat furnace 67 at a rate of about 25,625 pounds per hour and thence into isomerization reactor 69 by means of line 68. The composition of the total feed introduced into isomerization reactor 69 is set-forth in column 3 of the following Table IV.

Table IV

| Composition [1] | Net Feed to Isomerization Reactor 69 | Hydrogen-Rich Recycle Gas | Total Feed to Isomerization Reactor 69 |
|---|---|---|---|
| Molecular Weight | | 7.3 | 23.0 |
| Gravity, API° | 86.0 | | |
| $H_2$ | 0 | 1,536 | 1,536 |
| $C_1$ | 0 | 449 | 449 |
| $C_2$ | 0 | 313 | 313 |
| $C_3$ | 0 | 387 | 387 |
| Isobutane | 0 | 75 | 75 |
| n-butane | 0 | 63 | 63 |
| Isopentane | 782 | 1,536 | 2,318 |
| n-pentane | 10,073 | 918 | 10,991 |
| Cyclopentane | 484 | 84 | 568 |
| 2,2-Dimethylbutane | 275 | 34 | 309 |
| 2,3-Dimethylbutane | 380 | 43 | 423 |
| 2-Methylpentane | 1,757 | 230 | 1,987 |
| 3-Methylpentane | 1,028 | 120 | 1,148 |
| n-hexane | 2,273 | 120 | 2,393 |
| Methylcyclopentane | 1,507 | 117 | 1,624 |
| Cyclohexane and Benzene | 330 | 100 | 430 |
| $C_7$ | 316 | 131 | 447 |
| $C_8$ | 104 | 34 | 138 |
| $C_9$ | 26 | 0 | 26 |
| $C_{10}$ | 0 | 0 | 0 |
| $C_{11}$ | | 0 | |
| Total | 19,335 | 6,290 | 25,625 |

[1] Expressed in pounds per hour.

A bottom fraction rich in $C_7$ and heavier hydrocarbons and having the composition shown in column 1 of Table V below is withdrawn from the lower portion of tower 51 at a rate of 11,207 pounds per hour (984 b.p.s.d.) by means of line 71 having pump 72 positioned therein. A minor proportion of this stream or about a one-third portion thereof (309 b.p.s.d. or 3516 pounds per hour) is allowed to pass through line 73 and cooler 74 wherein it is cooled to about 100° F. and is introduced into the upper portion of absorber tower 76 wherein it is used as an absorbent to remove isopentane and other normally liquid hydrocarbons from a portion of the hydrogen-rich gaseous fraction obtained from the combined isomerization and reformer effluents to be described in more detail hereinbelow.

The remainder of the bottoms fraction from tower 51 is passed through line 83 at a rate of 675 b.p.s.d. wherein it is joined by the gasoline enriched oil passing from absorber 76 through line 79 by means of pump 81. The combined normally liquid stream flows through line 84 at a rate of 11,569 pounds per hour (1027 b.p.s.d.), is at a temperature of about 300° F., and has the composition shown in column 2 of Table V below. The liquid passing through line 84 is joined by a hydrogen-containing gas having a molecular weight of 7.3 flowing at a rate of 4087 pounds per hour through line 86, and the combined stream having a temperature of 150° F. is passed through line 87, heat exchanger 88 wherein its temperature is increased to about 513° F., preheat furnace 91 and thence into reformer reactor 93 by means of line 92 at a rate of 15,656 pounds per hour, the composition of the total feed to the reformer being as set-forth in column 3 of the following Table V.

Table V

| Composition [1] | Bottoms Fraction from Dehexanizer 51 | Net Feed to Reformer 93 | Total Feed to Reformer 93 |
|---|---|---|---|
| Molecular Weight | | | 23.4 |
| Gravity, API° | 49.6 | 51.6 | |
| $H_2$ | 0 | 1 | 993 |
| $C_1$ | 0 | 3 | 290 |
| $C_2$ | 0 | 12 | 221 |
| $C_3$ | | 35 | 290 |
| Isobutane | | 6 | 47 |
| n-butane | | 6 | 47 |
| Isopentane | | 202 | 1,222 |
| n-pentane | | 122 | 730 |
| Cyclopentane | | 7 | 56 |
| 2,2-Dimethylbutane | | 8 | 34 |
| 2,3-Dimethylbutane | | 8 | 34 |
| 2-Methylpentane | | 16 | 173 |
| 3-Methylpentane | | 16 | 94 |
| n-hexane | 99 | 107 | 176 |
| Methylcyclopentane | 480 | 480 | 556 |
| Cyclohexane and Benzene | 1,415 | 1,390 | 1,448 |
| $C_7$ | 4,004 | 3,953 | 4,036 |
| $C_8$ | 2,796 | 2,784 | 2,796 |
| $C_9$ | 1,374 | 1,374 | 1,374 |
| $C_{10}$ | 1,039 | 1,039 | 1,039 |
| $C_{11}$ | | | |
| Total | 11,207 | 11,569 | 15,656 |

[1] Expressed in pounds per hour.

Within isomerization reactor 69 there is maintained a fixed bed of about 7050 pounds of catalyst material comprising 0.3 weight percent rhodium on alumina and containing 10 weight percent of boron oxide. The reactor is maintained at a pressure of about 600 pounds per square inch gage and a temperature of 750° F. The flow rate of isomerization feed through the reactor is controlled to yield a space velocity of about 2.75 pounds of hydrocarbon per hour per pound of catalyst. The isomerization reaction proceeds in the presence of hydrogen with a net consumption thereof, and the conversion of n-pentane to isopentane being about 47.5 percent per pass based on the net feed to reactor.

Gaseous effluent from isomerization reactor 69 comprises a mixture of hydrogen, unreacted normal hexane, isohexanes, unreacted normal pentane, isopentane and a minor proportion of lower and higher boiling hydrocarbons, and has the composition given in column 1 of Table VI below. The isomerized product is discharged from reactor 69 by means of line 94 at a rate of 25,625 pounds per hour and is passed through heat exchanger 64 where heat is given up to the cooler feed flowing to the isomerization reactor thereby cooling the reactor effluent to 375° F.

The catalyst maintained within reforming reactor 93 contains 0.6 weight percent platinum on alumina disposed in a bed having an inner diameter of 2'6" and a length of 6'0". The reactor is maintained at a pressure of 600 pounds per square inch and a temperature of 960° F. and the flow rate therethrough is controlled to yield a space velocity of about 10.0 pounds of hydrocarbon per hour per pound of catalyst. Reformer effluent is withdrawn from reactor 93 by means of line 89 at a rate of 15,656 pounds per hour, and has the composition set-forth in column 2 of Table VI below. As is apparent from the comparison of the compositions of the total feed to the reformer (column 3, Table V) and the composition of the reformer effluent (column 2, Table VI), the reforming reaction produces hydrogen in an amount sufficient to supply the amount consumed by the isomerization process. The reformer effluent is passed through heat exchanger 88 wherein it is cooled to about 400° F. by giving up heat to the reformer feed, and is then passed through line 101 and is combined with the isomerization reactor effluent passing through line 96. The composition of total reactor effluents passing through conduit 97 is given in column 3 of Table VI below. The total effluent is then passed through cooler 98 and thence to high pressure separation drum 99 at a rate of 41,281 pounds per hour.

Table VI

| Composition [1] | Effluent from Isomerization Reactor 69 | Effluent from Reformer 93 | Total Effluent to Separator 99 |
|---|---|---|---|
| Molecular Weight | 23.0 | 20.4 | 21.9 |
| Gravity, API° | | | |
| $H_2$ | 1,520 | 1,160 | 2,680 |
| $C_1$ | 466 | 335 | 801 |
| $C_2$ | 348 | 310 | 658 |
| $C_3$ | 581 | 424 | 1,005 |
| Isobutane | 105 | 133 | 238 |
| n-butane | 93 | 134 | 227 |
| Isopentane | 7,607 | 1,222 | 8,829 |
| n-pentane | 5,700 | 730 | 6,430 |
| Cyclopentane | 565 | 56 | 621 |
| 2,2-Dimethylbutane | 296 | 34 | 330 |
| 2,3-Dimethylbutane | 400 | 34 | 434 |
| 2-Methylpentane | 2,497 | 173 | 2,670 |
| 3-Methylpentane | 1,503 | 94 | 1,597 |
| n-hexane | 1,607 | 329 | 1,936 |
| Methylcyclopentane | 1,331 | 556 | 1,887 |
| Cyclohexane and Benzene | 407 | 1,448 | 1,855 |
| $C_7$ | 439 | 3,652 | 4,091 |
| $C_8$ | 135 | 2,400 | 2,535 |
| $C_9$ | 25 | 1,477 | 1,502 |
| $C_{10}$ | 0 | 797 | 797 |
| $C_{11}$ | 0 | 158 | 158 |
| Total | 25,625 | 15,656 | 41,281 |

[1] Expressed in pounds per hour.

The purpose of separating drum 99 is to effect separation of hydrogen-rich gas from a heavier fraction comprising gasoline components. This is accomplished by maintaining drum 99 at a temperature of about 100° F. and about 570 p.s.i.g. A gaseous fraction rich in hydrogen having the composition shown in column 1 of Table VII below is withdrawn from drum 99 by means of line 100 at a rate of 10,914 pounds per hour. A minor proportion thereof (537 pounds per hour) having the composition shown in column 2 of Table VII thereof is allowed to pass through conduit 109 wherein it is joined by a light fraction obtained from a later stage of the process passing through line 111, and the combined stream is passed through line 78 to absorber 76. The fraction passing through line 111 contains $C_5$ and lighter hydrocarbons and has a molecular weight of 19.2 (composition set-forth in column 1 of Table VIII below), and is passed through conduit 111 at a rate of 219 pounds per hour. The remainder of the hydrogen-rich gas obtained as overhead from separator 99 is passed through line 102 and compressor 103, and another portion thereof (4087 pounds per hour) having the composition given in column 3 of the following Table VII is allowed to pass through line 86 and is combined with the reformer feed passing through line 84. The remainder of the hydrogen-rich recycle gas (6290 pounds per hour) having the composition shown in column 2 of Table IV above, is passed through conduit 104 wherein it is joined by overhead fraction obtained from tower 51 passing through conduit 59, and the combined feed is then passed to isomerization reactor 69 as described hereinabove. By combining the effluents from reactors 69 and 93, the hydrogen-rich gas produced in the reformer and which is not consumed in the isomerization reaction, is thereby readily separated and recycled to the reactors, as needed, and absorber using a minimum of separation steps.

Table VII

| Composition [1] | High Pressure Separation Gas | High Pressure Separation Gas to Absorber | Hydrogen Containing Gas to Reformer |
|---|---|---|---|
| Molecular Weight | 7.3 | 7.08 | 7.3 |
| Gravity, API° | | | |
| $H_2$ | 2,663 | 135 | 992 |
| $C_1$ | 774 | 38 | 287 |
| $C_2$ | 552 | 30 | 209 |
| $C_3$ | 677 | 35 | 255 |
| Isobutane | 122 | 6 | 41 |
| n-butane | 110 | 6 | 41 |
| Isopentane | 2,693 | 137 | 1,020 |
| n-pentane | 1,605 | 79 | 608 |
| Cyclopentane | 140 | 7 | 49 |
| 2,2-Dimethylbutane | 68 | 8 | 26 |
| 2,3-Dimethylbutane | 77 | 8 | 26 |
| 2-Methylpentane | 403 | 16 | 157 |
| 3-Methylpentane | 214 | 16 | 78 |
| n-hexane | 197 | 8 | 69 |
| Methylcyclopentane | 201 | 8 | 76 |
| Cyclohexane and Benzene | 158 | | 58 |
| $C_7$ | 214 | | 83 |
| $C_8$ | 46 | | 12 |
| $C_9$ | 0 | | |
| $C_{10}$ | 0 | | |
| $C_{11}$ | 0 | | |
| Total | 10,914 | 537 | 4,087 |

[1] Expressed in pounds per hour.

The condensed liquid in separator drum 99 having the composition shown in column 1 of Table VIII below, is passed therefrom at a rate of 30,367 pounds per hour (3025 b.p.s.d.) by means of line 112 to depentanizer tower 116. Conditions are maintained within this tower to provide for the removal of normal pentane, isopentane and lower boiling hydrocarbons overhead from the tower. The top of depentanizer tower is maintained at a temperature of 245° F. and a pressure of 145 p.s.i.g., and the bottom is maintained at a temperature of 368° F. and a pressure of 150 p.s.i.g., the heat requirements of the tower being supplied by conventional reboiler 117. The aforesaid overhead fraction having a molecular weight of 67.5, obtained thereby is passed through conduit 121, water condenser 122 and into separating drum 124 by means of line 123 at a rate of 35,885 pounds per hour. Within separating drum 124, the depentanizer overhead is separated into an overhead fraction comprising $C_5$ and lower boiling components and has the composition shown in column 2 of Table VIII below. This overhead vapor is passed through conduit 111 at a rate of 219 pounds per hour and is introduced into hydrogen-containing gas entering into the lower portion of absorber 76 as described hereinabove.

The condensed depentanizer overhead fraction is withdrawn from drum 124 through line 126 having pump 127 thereon and a portion thereof (2652 b.p.s.d.) is passed to the top of the depentanizer tower as reflux by means of line 128. The remainder of the condensed liquid (1284 b.p.s.d.) containing normal pentane and isopentane as the predominating components is passed to the stream of fresh feed entering the system through line 11, as part of the feed thereto. The composition of the recycle feed is given above in Table I, column 2.

The bottom of depentanizer tower 116 is provided with reboiler 117, and a bottoms fraction comprising the $C_6$ and heavier hydrocarbons having the composition shown in column 3 of Table VIII below is withdrawn therefrom by means of line 131, is cooled by cooler 132 and is withdrawn from the system at a rate of 18,513 pounds per hour as a product of the process. Although valve 119 is normally closed, it may be used to allow a portion of the $C_7+$ hydrocarbon fraction passing through line 84 to pass directly to $C_6+$ product such as when there is an excess of the $C_7+$ fraction.

*Table VIII*

| Composition [1] | High Pressure Separation Liquid from Drum 99 | Vapor from Depentanizer 116 [2] | Bottoms From Depentanizer 116 |
|---|---|---|---|
| Molecular Weight | | 19.2 | |
| Gravity, API° | 73.8 | | 58.7 |
| $H_2$ | 17 | 15 | |
| $C_1$ | 27 | 16 | |
| $C_2$ | 106 | 21 | |
| $C_3$ | 328 | 26 | |
| Isobutane | 116 | 6 | |
| n-butane | 117 | 6 | |
| Isopentane | 6,136 | 79 | |
| n-pentane | 4,825 | 50 | 326 |
| Cyclopentane | 481 | | 444 |
| 2,2-Dimethylbutane | 262 | | 235 |
| 2,3-Dimethylbutane | 357 | | 324 |
| 2-Methylpentane | 2,267 | | 2,093 |
| 3-Methylpentane | 1,383 | | 1,267 |
| n-hexane | 1,739 | | 1,618 |
| Methylcyclopentane | 1,686 | | 1,686 |
| Cyclohexane and Benzene | 1,697 | | 1,697 |
| $C_7$ | 3,877 | | 3,877 |
| $C_8$ | 2,489 | | 2,489 |
| $C_9$ | 1,502 | | 1,502 |
| $C_{10}$ | 797 | | 797 |
| $C_{11}$ | 158 | | 158 |
| Total | 30,367 | 219 | 18,513 |

[1] Expressed in pounds per hour.
[2] Composition of depentanizer overhead liquid given in Table I, column 2.

As indicated above, a portion of the bottoms fraction comprising $C_7$ and lighter boiling hydrocarbons is passed to the upper portion of absorber 76 wherein it is used to remove the major proportion of $C_5$ and higher boiling hydrocarbons from the lighter normally gaseous hydrocarbons and hydrogen produced during the isomerization and reforming reactions. The composition of the total feed introduced into the lower portion of absorber 76 by means of line 78 is given in column 1 of Table IX below and is the sum of the components contained in the portion of hydrogen-rich stream passing through line 109 and in the depentanizer overhead vapor passing through line 111. The normally liquid stream introduced at the top of absorber 76 is passed in countercurrent contact with the hydrogen-containing stream and absorbs $C_5$ and heavier components therefrom.

The temperature at the top of the absorber tower is about 100° F.; whereas the temperature in the bottom of the absorber is about 110° F. and the pressure therein is 570 p.s.i.g. Gaseous material containing hydrogen and having the composition shown in column 2 of Table IX below, is discharged from the top of the absorber tower by means of line 77 and is yielded as fuel gas. The enriched normally liquid stream having the composition shown in column 3 of Table IX below, is discharged from the absorber tower at a rate of 3878 pounds per hour (352 b.p.s.d.) and is passed to the reforming unit as described herein. The amount of gasoline components removed from the hydrogen-containing stream may be compared with the loss in weight of the hydrogen-containing stream, which originally has a molecular weight of 8.7 when passed to the absorber at the rate of 756 pounds per hour, and has a molecular weight of about 4.9 when discharged from the top of the absorber by means of line 77 at the rate of 394 pounds per hour.

*Table IX*

| Composition [1] | Total Feed to Bottom of Absorber 76 | Absorber Overhead | Absorber Residual Oil |
|---|---|---|---|
| Molecular Weight | 8.7 | 4.9 | |
| Gravity, API° | | | 56.0 |
| $H_2$ | 150 | 149 | 1 |
| $C_1$ | 54 | 51 | 3 |
| $C_2$ | 51 | 39 | 12 |
| $C_3$ | 61 | 26 | 35 |
| Isobutane | 12 | 6 | 6 |
| n-butane | 12 | 6 | 6 |
| Isopentane | 216 | 14 | 202 |
| n-pentane | 129 | 7 | 122 |
| Cyclopentane | 7 | | 7 |
| 2,2-Dimethylbutane | 8 | | 8 |
| 2,3-Dimethylbutane | 8 | | 8 |
| 2-Methylpentane | 16 | | 16 |
| 3-Methylpentane | 16 | | 16 |
| n-hexane | 8 | | 34 |
| Methylcyclopentane | 8 | 8 | 151 |
| Cyclohexane and Benzene | | 25 | 415 |
| $C_7$ | | 51 | 1,173 |
| $C_8$ | | 12 | 805 |
| $C_9$ | | | 858 |
| $C_{10}$ | | | |
| $C_{11}$ | | | |
| Total | 756 | 394 | 3,878 |

[1] Expressed in pounds per hour.

The method for effecting the process of this invention may be any of the procedures herein described, and various modifications and alterations of these procedures may become obvious to those skilled in the art from the accompanying description and disclosure.

Having described our invention, we claim:

1. A process which comprises in combination the steps of passing a fraction containing $C_5$ and $C_6$ hydrocarbons to an isomerization zone, contacting said fraction with a solid isomerization catalyst under conditions such that said $C_5$ and $C_6$ hydrocarbons are converted to more highly branched compounds, withdrawing effluent from said isomerization zone and combining said effluent with an effluent comprising $C_7$ and higher boiling reformed liquid product from a reforming zone in combination with said isomerization zone, separating from the combined effluent a normally gaseous hydrocarbon fraction, and passing said normally gaseous hydrocarbon fraction to an absorption zone wherein it is contacted with a fraction comprising $C_7$ and higher boiling hydrocarbons passing to said reforming zone to effect removal therefrom of normally liquid hydrocarbons.

2. A process which comprises in combination the steps of passing a fraction containing $C_5$ and $C_6$ hydrocarbons to an isomerization zone, contacting said fraction with a solid isomerization catalyst under conditions such that said $C_5$ and $C_6$ hydrocarbons are converted to more highly branched compounds, withdrawing effluent from said isomerization zone and combining said effluent with an effluent comprising hydrogen and $C_7$ and higher boiling reformed liquid product from a reforming zone in combination with said isomerization zone, separating from the combined effluent a hydrogen-rich gas stream and a normally gaseous hydrocarbon fraction, passing said hydrogen-rich gas to said isomerization zone as part of the feed thereto and passing said normally gaseous hydrocarbon fraction to an absorption zone wherein it is contacted with a fraction comprising $C_7$ and higher boiling hydrocarbons passing to said reforming zone, to effect removal therefrom of normally liquid hydrocarbons.

3. A process for the conversion of a mixture of hydrocarbons comprising $C_5$ and higher molecular weight hydrocarbons which comprises in combination the steps of separating said mixture into a fraction comprising isomerizable $C_5$ and $C_6$ hydrocarbons and a fraction comprising $C_7$ and higher boiling hydrocarbons, contacting said fraction comprising isomerizable $C_5$ and $C_6$ hydrocarbons with a solid isomerization catalyst under suitable conversion conditions, contacting said fraction comprising $C_7$ and higher boiling hydrocarbons with a reforming catalyst under suitable conversion conditions, combining an effluent from said isomerization zone with effluent from said reforming zone, and separating the combined effluent into a hydrogen-rich gas, a normally gaseous hydrocarbon fraction, and a normally liquid hydrocarbon fraction, passing a portion of said hydrogen-rich gas, and said normally gaseous hydrocarbon fraction to an absorption zone wherein it is contacted with $C_7$ and higher boiling hydrocarbons passing to said reforming zone to effect removal therefrom of normally liquid hydrocarbons.

4. A process for the conversion of a mixture of hydrocarbons comprising $C_5$ and higher molecular weight hydrocarbons which comprises in combination the steps of separating said mixture into a fraction comprising isomerizable $C_5$ and $C_6$ hydrocarbons and a fraction comprising $C_7$ and higher boiling hydrocarbons, contacting said fraction comprising isomerizable $C_5$ and $C_6$ hydrocarbons with a solid isomerization catalyst in the presence of added hydrogen under suitable isomerization conditions to convert said $C_5$ and $C_6$ hydrocarbons to more highly branched isomers, contacting said fraction comprising $C_7$ and higher boiling hydrocarbons with a reforming catalyst under suitable conversion conditions, combining the reaction zone effluents and separating the combined effluent into a hydrogen-rich gas, a normally gaseous hydrocarbon fraction, a fraction comprising normally liquid product containing $C_6$ and higher boiling hydrocarbons, and a fraction comprising $C_5$ product isomer and unreacted $C_5$ hydrocarbon, passing a portion of said hydrogen-rich gas and said normally gaseous hydrocarbon fraction to an absorption zone wherein it is contacted with $C_7$ and higher boiling hydrocarbons passing to said reforming zone to effect removal therefrom of normally liquid hydrocarbons, recovering said fraction comprising normally liquid product containing $C_6$ and higher molecular weight hydrocarbons as a product of the process, withdrawing from said fraction comprising $C_5$ product isomer and unreacted $C_5$ hydrocarbon, the $C_5$ product isomer and passing said unreacted $C_5$ hydrocarbon to said isomerization zone, and recovering $C_5$ product isomer as a product of the process.

5. A process for the conversion of hydrocarbons which comprises in combination the steps of separating a hydrocarbon fraction containing $C_5$ and higher molecular weight hydrocarbons into a fraction comprising $C_5$ and $C_6$ components and a normally liquid fraction comprising $C_7$ and heavier hydrocarbons, introducing a hydrogen-rich gas into said fraction comprising $C_5$ and $C_6$ hydrocarbons and passing the resultant mixture to an isomerization zone wherein the $C_5$ and $C_6$ hydrocarbons are converted to more highly branched compounds in the presence of a solid isomerization catalyst, introducing a hydrogen-rich gas into said fraction comprising $C_7$ and heavier hydrocarbons and passing the resultant mixture to a reforming zone, withdrawing a hydrogen-containing effluent from said reforming zone and combining said effluent with the effluent from said isomerization zone, passing the combined effluents to a hydrogen separation zone, withdrawing a hydrogen-rich gas stream and a normally liquid hydrocarbon stream from said separation zone, passing a portion of said hydrogen-rich gas stream to said fraction passing to said isomerization zone, passing another portion of said hydrogen-rich gas to said reforming zone, separating said normally liquid hydrocarbon fraction from said hydrogen separation zone into a normally gaseous fraction comprising normally gaseous hydrocarbons and a lesser amount of normally liquid hydrocarbons, and a normally liquid fraction, passing said normally gaseous fraction to said absorption zone wherein the same is contacted with a portion of said normally liquid fraction comprising $C_7$ and heavier hydrocarbons passing to the reforming zone such that normally liquid hydrocarbons are absorbed by said normally liquid fraction from said fraction comprising normally gaseous hydrocarbons.

6. A process for the conversion of hydrocarbons which comprises in combination the steps of separating a hydrocarbon fraction containing $C_5$ and higher molecular weight hydrocarbons into a fraction comprising $C_5$ and $C_6$ components and a normally liquid fraction comprising $C_7$ and heavier hydrocarbons, introducing a hydrogen-rich gas into said fraction comprising $C_5$ and $C_6$ hydrocarbons and passing the resultant mixture to an isomerization zone wherein the same is contacted in the vapor phase with a solid isomerization catalyst under suitable isomerization conditions, introducing a hydrogen-rich gas into said fraction comprising $C_7$ and heavier hydrocarbons and passing the resultant mixture to a reforming zone, withdrawing a hydrogen-containing effluent from said reforming zone and combining said effluent with the effluent from said isomerization zone, withdrawing a hydrogen-rich stream from said combined effluents and passing portions thereof to said fractions entering the isomerization and reforming zones and another portion to an absorption zone, separating the remainder of said combined effluents into a normally gaseous hydrocarbon fraction containing lesser amounts of normally liquid hydrocarbons, a fraction comprising $C_5$ product isomer and unreacted $C_5$ hydrocarbon, and a fraction comprising $C_6$ and higher boiling hydrocarbons, introducing said normally gaseous hydrocarbon fraction into said hydrogen stream entering the absorption zone, in said absorption zone contacting said hydrogen-containing stream with a portion of the feed passing to the reforming zone to effect removal of normally liquid hydrocarbons, withdrawing from said absorption zone a normally gaseous hydrocarbon fraction and a normally liquid hydrocarbon fraction enriched with normally liquid hydrocarbons removed from said normally gaseous fraction fed to said absorption zone, and passing the enriched normally liquid fraction from said absorption zone to said reforming zone as feed thereto.

7. A hydrocarbon conversion process which comprises introducing a feed comprising isopentane, n-pentane, $C_6$ paraffins and $C_7$ and higher molecular weight hydrocarbons and a first separation step, separating the mixture in said first separation step into an overhead fraction comprising isopentane and a bottoms fraction comprising n-pentane, $C_6$ paraffins and $C_7$ and higher molecular weight hydrocarbons, passing said bottoms fraction to a second separation step, sepaarting the mixture in said second separation step into an overhead fraction comprising n-pentane and $C_6$ paraffins and a bottoms fraction comprising $C_7$ and higher boiling hydrocarbons, passing said overhead fraction comprising n-pentane and $C_6$ paraffins together with a hydrogen-rich gas to an isomerization zone, in said isomerization zone contacting said fraction in the vapor state with a solid isomerization catalyst, passing said bottoms fraction comprising $C_7$ and higher molecular weight hydrocarbons to a reforming zone, in said reforming zone contacting said $C_7$ and higher boiling hydrocarbons under suitable reforming conditions with a reforming catalyst, removing from said isomerization zone effluent comprising hydrogen, $C_6$ paraffins, isopentane and unreacted n-pentane, combining the same with effluent containing hydrogen, normally liquid hydrocarbons, and normally gaseous hydrocarbons from said reforming zone, separating the combined effluent into a hydrogen-rich gas, a fraction containing normally gaseous hydrocarbons, a fraction comprising isopentane and unreacted n-pentane, and a fraction comprising $C_6$ and higher molecular weight hydrocarbons, passing a portion of said hydrogen-rich gas together with said normally gaseous hydrocarbon fraction to an absorption zone wherein it is contacted with a portion of said fraction comprising $C_7$ and heavier hydrocarbons passing to the reforming zone such that normally liquid hydrocarbons are removed therefrom, passing said fraction comprising isopentane and n-pentane to said first separation step as part of the feed thereto and recovering from said first separation step said overhead fraction comprising isopentane as a product of the process.

8. A hydrocarbon conversion process which comprises in combination the steps of introducing a feed containing butane, n-pentane, isopentane, hexanes and $C_7$ and heavier hydrocarbons into a first distillation zone, in said first distillation zone separating the mixture into an overhead fraction comprising butane and a bottoms fraction comprising $C_5$ and higher boiling hydrocarbons, passing said bottoms fraction comprising $C_5$ and higher boiling hydrocarbons to a second distillation zone wherein the mixture is separated into an overhead fraction essentially comprising isopentane, and a bottoms fraction comprising n-pentane, hexanes and $C_7$ and higher boiling hydrocarbons, passing said bottoms fraction from said second distillation zone to a third distillation wherein the mixture is separated into an overhead fraction comprising n-pentane and hexanes and a bottoms fraction comprising $C_7$ and higher boiling hydrocarbons, introducing a hydrogen-rich gas into said overhead fraction comprising n-pentane and hexanes and passing the mixture to an isomerization zone wherein the mixture is contacted with a solid isomerization catalyst such that n-pentane is converted to isopentane and hexanes are converted to more highly branched compounds, passing a portion of said bottoms fraction from said third distillation zone to an absorption zone wherein it is brought into contact with a normally gaseous hydrocarbon fraction having normally liquid hydrocarbons dissolved therein, passing a bottoms fraction enriched with said normally liquid hydrocarbons from said absorption zone and passing it together with the remainder of said bottoms fraction from said third distillation zone to a reforming zone, contacting said fraction containing $C_7$ and higher boiling hydrocarbons with a reforming catalyst to produce normally liquid product, hydrogen and normally gaseous hydrocarbon by-products, combining the effluents from said isomerization and reforming zones and passing the combined effluents to a hydrogen removal zone wherein a hydrogen-rich gas is separated therefrom, pasing a portion of said hydrogen-rich gas to said isomerization zone, passing the remainder of said combined effluent from said hydrogen removal zone to a fourth distillation zone and separating the same into said normally gaseous hydrocarbon fraction having normally liquid hydrocarbons dissolved therein, a fraction comprising unreacted n-pentane and isopentane, and a fraction comprising $C_6$ and higher boiling hydrocarbon product, passing said fraction comprising unreacted n-pentane and isopentane to said first distillation zone as part of the feed thereto, and recovering as products of the process said fraction comprising isopentane and said fraction comprising $C_6$ and higher boiling hydrocarbons.

References Cited in the file of this patent
UNITED STATES PATENTS

| | | |
|---|---|---|
| 2,134,926 | Ostergaard | Nov. 1, 1938 |
| 2,238,860 | Kemp | Apr. 15, 1941 |
| 2,354,866 | Lang | Aug. 1, 1944 |
| 2,358,149 | Cooke | Sept. 12, 1944 |
| 2,358,183 | Ostergaard | Sept. 12, 1944 |
| 2,376,077 | Oberfell et al. | May 15, 1945 |
| 2,376,078 | Oberfell et al. | May 15, 1945 |
| 2,379,334 | Atwell | June 26, 1945 |
| 2,651,597 | Corner et al. | Sept. 8, 1953 |
| 2,665,239 | Howard et al. | Jan. 5, 1954 |
| 2,834,718 | Stanford et al. | May 13, 1958 |
| 2,905,619 | Sutherland | Sept. 22, 1959 |
| 2,946,736 | Muffat et al. | July 26, 1960 |

UNITED STATES PATENT OFFICE
CERTIFICATE OF CORRECTION

January 23, 1962

Patent No. 3,018,244

George W. Stanford et al.

It is hereby certified that error appears in the above numbered patent requiring correction and that the said Letters Patent should read as corrected below.

Column 1, line 39, strike out "and unsaturated"; column 5, line 74, for "calcined" read -- calcining --; column 11, line 23 for "a" read -- as --; column 14, line 65, the indistinct numera should appear as -- 45 --; column 15, lines 1 and 2, for "positions" read -- positioned --; same column 15, Table IV, fourth column, line 11 thereof, the indistinct numeral should appear as -- 568 --; same Table IV, fourth column line 16, thereof, for "2,393" read -- 2,393 --; column 22, line 40, for "and" read -- into --.

Signed and sealed this 18th day of December 1962.

(SEAL)
Attest:

ERNEST W. SWIDER
Attesting Officer

DAVID L. LADD
Commissioner of Patents